United States Patent [19]

Wegmüller et al.

[11] 3,979,285
[45] Sept. 7, 1976

[54] PROCESS FOR THE PURIFICATION OF INDUSTRIAL EFFLUENTS

[75] Inventors: Hans Wegmüller, Riehen; Jaroslav Haase, Basel, both of Switzerland

[73] Assignee: Ciba-Geigy Corporation, Ardsley, N.Y.

[22] Filed: May 29, 1975

[21] Appl. No.: 582,021

Related U.S. Application Data

[63] Continuation of Ser. No. 356,853, May 3, 1973, abandoned.

[30] Foreign Application Priority Data

May 10, 1972  Switzerland............... 007012/72

[52] U.S. Cl............................ 210/36; 210/37 R; 210/502
[51] Int. Cl.²................... C02B 1/60; C02C 5/08
[58] Field of Search............... 210/24, 28, 36, 37 R, 210/37 B, 40, 502, 506–508

[56] References Cited
UNITED STATES PATENTS 2,040,818  5/1936  Badollet............................ 210/506
2,407,599  9/1946  Auten et al........................ 210/36
2,798,850  7/1957  Voightman et al................. 210/36
2,955,067  10/1960  McBurrey et al.................. 210/502
3,398,092  8/1968  Fields et al....................... 210/24
3,699,039  10/1972  Calmon et al..................... 210/28
3,716,483  2/1973  Renner............................. 210/40
3,790,370  2/1974  Lalancette........................ 210/42 R
3,829,380  8/1974  Oohara............................. 210/40
3,853,758  12/1974  Hurwitz et al..................... 210/37 R
3,857,823  12/1974  Ackermann....................... 210/502

FOREIGN PATENTS OR APPLICATIONS 847,028  9/1960  United Kingdom

Primary Examiner—Thomas G. Wyse
Attorney, Agent, or Firm—Joseph G. Kolodny; Edward McC. Roberts; Prabodh I. Almaula

[57] ABSTRACT

A novel process for purifying industrial effluents which comprises bringing said effluents into contact with cellulosic absorbent which has been pretreated with precipitants.

6 Claims, No Drawings

PROCESS FOR THE PURIFICATION OF INDUSTRIAL EFFLUENTS

This is a continuation of application Ser. No. 356,853, filed on May 3, 1973, now abandoned.

The present invention relates to a process for the purification of industrial effluents, especially for the decolourisation of waste liquors arising in the textile, paper and leather industry, which is characterised in that the effluents are brought into contact with cellulosic absorbent which has been pretreated with precipitants. Preferably, filters of cellulose itself or of waste sheets from printing are used.

The purification of industrial effluents is a problem and proves extremely difficult particularly when the removal of water-soluble organic substances is concerned.

As part of this problem, the decolourisation and purification of effluents arising in the textile, paper and leather industry is an urgent requirement.

Various proposals have already been made for removing residues of dyestuffs and auxiliaries from industrial effluents. Thus, for example, it has been provided that the residual liquors, including wash waters, are collected in collecting tanks and that the residues of dyestuffs and auxiliaries are precipitated therein by addition of suitable flocculating agents and separated out by sedimentation and filtration. However, these processes suffer from various disadvantages. Above all, the volumes of water to be treated are extremely large and sedimentation is frequently protracted.

Surprisingly, it has now been found that a complete or at least very extensive purification, including decolourisation, of industrial effluents is achieved if these are brought into contact with absorbents which consist of cellulose pretreated with precipitants. The process according to the invention is above all suitable for the removal of anionic dyestuffs, optical brighteners, dyeing auxiliaries and washing agents, and for the elimination of residues of tanning agent.

By means of the process according to the invention it is not only possible extensively to free incompletely spent treatment liquors from the abovementioned substances but also satisfactorily to purify the corresponding liquors which have been diluted with rinsing effluents and which in most cases contain mixtures of dyestuffs and washing agents.

Because of its broad applicability, the present process permits a saving of fresh water, through possible recirculation of residual liquors or waste liquors which arise, such saving being demanded with ever increasing urgency at the present time.

Where residual liquors or waste liquors are spoken of in the process according to the invention, the effluents of the textile, paper and leather industry which arise in connection with dyeing, washing and tanning processes are above all concerned, regardless of the apparatus employed. These liquors can originate, for example, in the case of a dyehouse, from the customary dyeing apparatuses, such as are used for dyeing loose fibre material, tops, yarn and woven fabrics or knitted fabrics, and also from cleaning apparatuses, for example from an open-width washing machine.

The effluents to be purified are preferably brought into contact in the undiluted state with cellulose material pretreated with precipitants. In principle, three processes are suitable for this purpose:

a. The so-called stirring process, wherein the water to be purified is stirred with the pretreated cellulose material in a vessel and the cellulose material and water are then separated from one another.

b. The so-called flow bed process in which the pretreated cellulose material is kept in the suspended state by the counter-current flow of the liquor to be purified.

c. The so-called filtration process wherein the liquor to be purified is passed through pre-treated cellulose filter material.

Of these three process variants, the filtration process (c) is preferably used, and above all the following three apparatus variants are suitable.

1. The treatment apparatus, for example dyeing device, is firmly connected to the filter apparatus.
2. The filter apparatus is movable and can be coupled to any treatment apparatus, as required.
3. The effluents originating from the treatment liquors are combined in a suitable vessel and are thereafter filtered conjointly.

The purification of the effluents is preferably carried out at 10° to 150°C. However, it is preferably carried out just below the treatment temperature, that is to say at between 30° and 130°C depending on the treatment conditions. The purification of the effluents can also take place under pressure, if appropriate.

The cellulose to be used as the carrier material in the purification consists, for example, of bleached or unbleached spruce sulphite cellulose, Kraft cellulose or waste sheets from printing, which are in a suitable form. The waste sheets from printing are disintegrated on machines suitable for this purpose, for example on a Hydrapulper. The cellulose can be in the form of granules, filter paper or paper pulp.

Suitable precipitants are in principle compounds which are adsorptively bound by the cellulose and which at the same time exert a precipitating or retaining action on the residual substances in question such as, for example, dyestuffs, optical brighteners, washing agents or tanning agents. In this respect, water-soluble basic aminoplasts such as formaldehyde-dicyandiamide condensation products have proved suitable. Advantageous results are conveniently achieved with condensation products of formaldehyde, dicyandiamide and urea or an alkylenepolyamine with 2 to 12, preferably with 2 to 8, carbon atoms, and 2 to 5 amino groups. The alkylenepolyamines are, for example, tetraethylenepentamine, triethylenetetramine, tributylenetetramine, diethylenetriamine, hexamethylenediamine, ethylenediamine, propylenediamine or butylenediamine.

Suitable basic aminoplasts are, above all, formaldehydedicyandiamide-ethylenediamine or formaldehyde-urea-dicyandiamide condensation products. Preferred products are obtained, for example, by condensation of 2 mols of formaldehyde with 1 mol of the reaction product of 2 mols of dicyandiamide with 1 mol of ethylenediamine, or the corresponding acid salt such as the hydrochloride. Other products which are also preferred are manufactured by condensation of 1 mol each of urea, dicyandiamide and formaldehyde in the presence of acid such as hydrochloric acid.

Further products are obtained by condensation of 3 to 4 mols of dicyandiamide with 7 mols of formaldehyde and 1 mol of the tetrahydrochloride of triethylenetetramine.

However, precipitants of particular practical interest are the polyamidopolyamines which are obtained by reaction of polymerised, preferably dimerised to trimerised, fatty acids with polyamines, preferably in such a ratio that the resulting polyamide resin has an amine value in the range of about 200 to 650 mg of potassium hydroxide per gram of polyamide. As polyamines which can be used for the manufacture of polyamides it is possible to employ aromatic polyamines or especially aliphatic polyamines which can also contain heterocyclic structures, such as imidazolines. Polymeric fatty acids, which are advantageously present in such polyamides, are obtained by polymerisation of one or more unsaturated longchain aliphatic or aromatic-aliphatic acids or their esters or other derivatives which can easily be converted into the acid. Suitable examples of such polymeric fatty acids are described in British Patent Specifications Nos. 878,985 and 841,554.

These polyaminoamides can be employed by themselves or in combination with the abovementioned dicyandiamide condensation products.

The polymeric unsaturated fatty acids used here are advantageously aliphatic ethylenically unsaturated dimeric to trimeric fatty acids. Preferably, the polyamides from polyalkylenepolyamines and aliphatic ethylenically unsaturated dimeric to trimeric fatty acids, which are derived from monocarboxylic acids with 16 to 22 carbon atoms, are manufactured. These monocarboxylic acids are fatty acids, with at least one and preferably 2 to 5 ethylenically unsaturated bonds. Representatives of this class of acids are, for example, oleic acid, hiragonic acid, elaeostearic acid, licanic acid, arachidonic acid, clupanodonic acid and especially linoleic acid and linolenic acid. These fatty acids can be obtained from natural oils wherein they occur, above all, as glycerides.

The dimeric to trimeric fatty acids are obtained in a known manner by dimerisation of monocarboxylic acids of the indicated type. The so-called dimeric fatty acids always contain trimeric acids and a small amount of monomeric acids.

Dimerised to trimerised linoleic or linolenic acids are particularly suitable. The technical products of these acids as a rule contain 75 to 95 percent by weight of dimeric acid, 4 to 22 percent by weight of trimeric acid and 1 to 3% of monomeric acid. Accordingly, the molar ratio of dimeric to trimeric acid is about 5:1 to 36:1. Polymeric fatty acids or esters which are used for the manufacture of the reactive polyamides can also be epoxidised, for example by reaction with peracetic acid, performic acid or hydrogen peroxide and formic acid or acetic acid. Suitable epoxidised fatty acids and esters are described in British Patent Specifications Nos. 810,348 and 811,797.

Polyamides which can be used according to the invention can also be condensation products of polymeric fatty acids with polyamines, as described in British Patent Specifications Nos. 726,570 and 847,028, it being possible to react these products with epoxide resins which are produced by reaction of polyhydric phenols with polyfunctional halogenohydrins and/or glycerinedichlorhydrin and which are described in U.S. Pat. Nos. 2,585,115 and 2,589,245.

Reactive forms of polyamides obtained by condensation polymerisation, at high temperatures, from a reaction mixture which contains polymeric fatty acids (manufactured according to British Patent Specifications Nos. 878,985 and 841,544), monomeric fatty acids and low polyalkylenepolyamines can also be used in the present invention.

Suitable polyamide resins which can be used for the manufacture of the filter materials which can be employed according to the invention are described, for example, in British Patent Specifications Nos. 726,570, 810,348, 811,797, 847,028, 865,656 and 1,108,558, for example the compounds which are sold under the tradenames "Versamid 115", "Versamid 125", "Versamid 140", "Ancamid 400", "Beckalide K 189", "Casamid 167", "Casamid 185M", "Genamid 2000", "Genamid 250", "Synolide 960", "Merginamide L 410" and "Wolfamid No. 4" ("Ancamide", "Beckalide", "Casamid", "Genamid", "Synolide", "Merginamide", "Versamid" and "Wolfamid" are trademarks).

Further precipitants are the polymers of an alkyleneimine with 2 to 4 carbon atoms which have a molecular weight (MW) of 20,000 to 80,000, preferably 30,000 to 40,000. Suitable alkyleneimines are in particular ethyleneimine, propyleneimine, 1,2-butyleneimine and 2,3-butyleneimine. Of all the alkyleneimines, ethyleneimine is preferentially used.

Precipitants which consist of two components are also suitable for the manufacture of filter material of particularly high performance. Such precipitants are manufactured in a simple manner by polymer precipitation in the presence or absence of cellulose. This polymer precipitation is preferably carried out by precipitating the abovementioned polymeric poly-cationic precipitants in an aqueous medium by means of a poly-anionic polymer. In this way, sparingly water-soluble polymer associates are produced, which are absorbed on the surface of the cellulose which may have been present during the precipitation. If the polymer precipitation is carried out in the absence of cellulose, the resulting polymer associates are subsequently applied, in a suitable form, to the cellulose.

Optionally substituted homopolymers or copolymers of aliphatic $\alpha,\beta$-ethylenically unsaturated carboxylic acids, advantageously in the form of their alkali metal salts, especially of the sodium or potassium salts, or in the form of their ammonium salts, optionally mixed with corresponding free polycarboxylic acids, have above all proved suitable as poly-anionic polymeric precipitants.

Preferably, water-soluble optionally substituted homopolymeric acrylic acids are used, for example homopolymers of the following monomers: acrylic acid, methacrylic acid, $\alpha$-ethylacrylic acid, $\alpha$-isopropylacrylic acid, $\alpha$-butylacrylic acid and $\alpha$-chloroacrylic acid. Water-soluble homopolymers of acrylic or methacrylic acid with a molecular weight of 20,000 to 1,000,000, especially with a molecular weight of 50,000 to 150,000, are particularly preferred.

Copolymeric aliphatic $\alpha,\beta$-ethylenically unsaturated carboxylic acids are above all copolymerisation products of acrylic acid and methacrylic acid, but also copolymerisation products of acrylic acid or methacrylic acid with another substituted acrylic acid mentioned earlier.

Further poly-anionic copolymerisation products are obtained by copolymerisation of acrylic or methacrylic acid with compounds containing vinyl groups and capable of copolymerisation, especially with water-soluble or water-insoluble comonomers. As examples of water-soluble comonomers there may be mentioned:

a. comonomers containing sulphonic acid groups, such as styrenesulphonic acid;

b. comonomers containing carboxylic acid groups, such as crotonic acid;

c. comonomers containing carboxylic acid amide groups, and their N-hydroxyalkyl derivatives, such as acrylic acid amide, methacrylic acid amide, N-hydroxymethyl-, N-$\beta$-hydroxyethyl-, N-$\gamma$-hydroxypropyl- and N,N-bis-$\beta$-hydroxyethyl-acrylic acid amide, and N-hydroxymethyl-, N-$\beta$-hydroxyethyl-, N-$\gamma$-hydroxypropyl- and N,N-bis-$\beta$-hydroxyethyl-methacrylic acid amide;

d. water-soluble, especially sulphonated, derivatives of $\beta$-hydroxyalkyl-acrylic acid amides or -methacrylic acid amides which are obtained, for example, by condensation of acrylic acid halides or methacrylic acid halides, especially chlorides, with reaction products of alkanolamines and chlorosulphonic acid;

e. copolymerisable aldehydes, such as acrolein or crotonaldehyde.

As examples of suitable water-insoluble comonomers there may be mentioned:

i. acrylic acid alkyl esters or methacrylic acid alkyl esters with 1 to 12 carbon atoms in the alkyl radical, which can optionally be substituted further, especially by hydroxyl groups, such as acrylic acid or methacrylic acid methyl esters, ethyl esters, $\beta$-hydroxyethyl esters, n-butyl esters and dodecyl esters;

ii. vinyl esters of aliphatic carboxylic acids possessing 1 to 12 carbon atoms or of mixtures of such carboxylic acids such as vinyl acetate, vinyl formate, vinyl butyrate or vinyl esters of the carboxylic acid mixture with 9 to 11 carbon atoms known under the tradename VEOVA 911 (also called "Versatic Acid" vinyl ester).

iii. Vinyl benzenes, such as styrene, chlorostyrene and methylstyrene.

The poly-anionic polymers mentioned can be manufactured in a manner which is in itself known, in aqueous solution or suspension, under the action of catalysts, preferably radical-forming catalysts, such as hydrogen peroxide, ammonium persulphate, potassium persulphate or organic peroxides, for example dibenzoyl peroxide, or by using ammonium persulphate and sodium bisulphite. They are appropriately manufactured at a temperature between 40° and 100°C.

Carboxymethylated cellulose derivatives can be employed as further poly-anionic precipitants. Carboxymethylcellulose, which as a rule is used in the form of its water-soluble alkali metal salts, such as the sodium salt or potassium salt, is particularly suitable. Such carboxymethylcellulose derivatives appropriately have a degree of substitution (DS) of 0.4 to 2 carboxymethylcellulose salts with DS = 0.7 to 1.2 are preferred. (The degree of substitution DS is defined according to Enc. of Polym. Sci. and Technol. volume 3, page 468). The amount of anionic precipitant employed advantageously fluctuates between 10 and 200%, relative to the cationic precipitant. Preferably, 20 to 100% of the poly-anionic agent are employed.

To manufacture filter material of particularly high performance which in addition to high retention, for example for anionic dyestuffs and optical brighteners, also displays a very high retention capacity for anionic surface-active agent and tanning-agents, a combination of the abovementioned precipitants with salts of polyvalent metals such as, for example, aluminum sulphate, aluminum chloride, iron sulphate, iron chloride, magnesium sulphate, magnesium chloride and calcium chloride has proved appropriate. Preferably, these metal salts are employed in the hydrated form of the corresponding neutral or basic metal oxides. This is appropriately done by adding inorganic or organic bases to the aqueous solution of the abovementioned metal salts. As inorganic bases, alkali metal hydroxides are preferably employed, for example sodium hydroxide, potassium hydroxide and aqueous ammonia, whilst as organic bases alkylamines are above all employed, such as, for example, methylamine, dimethylamine or trimethylamine, ethylamine, diethylamine or triethylamine and alkanolamines such as monoethanolamine, diethanolamine or triethanolamine.

The amount of the metal salts employed advantageously varies between 10 and 300% relative to the amount of the precipitant employed. Preferably, 50 to 200% of the metal salt are used, relative to the used amount of the precipitant employed.

The pretreatment of the cellulosic material with precipitants is appropriately carried out in aqueous suspension, for example at room temperature, at 20°C. However, it can also be carried out at an elevated temperature, up to 100°C. The amount of precipitant employed advantageously varies between 0.5 and 20% relative to the cellulosic material. Appropriately, 2 – 10% are employed for this purpose.

As preparation for the pretreatment, the cellulose or waste sheets from printing are converted into a form suitable for this purpose, especially into a fibre suspension. Depending on the temperature conditions chosen, the duration of the pretreatment can vary between a few minutes and several hours. The pretreated cellulose is subsequently converted into filters or filter materials according to known methods.

Dyestuffs which are removed from the effluents by the process according to the invention can be both water-soluble and water-dispersible dyestuffs or optical brighteners. The process is preferentially suitable for the removal of water-soluble, especially anionic, dyestuffs or optical brighteners.

In the case of water-soluble dyestuffs, dyestuffs which are retained particularly well are those which are water-soluble because of the presence of acid groups, such as carboxylic acid groups, but especially sulphonic acid groups or acid sulphuric acid ester groups. They can be reactive or unreactive towards the fibre material to be dyed and can furthermore belong to the most diverse categories, such as, for example, those of the styryl, oxazine, formazane, quinophthalone, triphenylmethane, xanthene, perinone, azomethine, nitro, nitroso, acridone or phthalocyanine dyestuffs or especially the metallised, metal-free or metallisable monoazo or polyazo dyestuffs.

The retaining action is very particularly pronounced in the case of the so-called direct dyestuffs. However, the retaining capacity is also considerable in the case of metal complex dyestuffs.

The process according to the invention is not only suitable for the decolourisation of residual liquors which arise in the dyeing of textiles, paper or leather but also performs valuable service when it is a matter of removing residues of optical brighteners from washing liquors and bleaching liquors. Particularly favourable results are obtained in those cases in which the optical brightener to be eliminated is of anionic character. Examples of such brighteners are: 4,4'-bis-(acylamino)-stilbene-2,2'-disulphonic acids, 4,4'-bis(- triazinylamino)-stilbene-2,2'-disulphonic acids, 4,4'-bis-(azolyl)-stilbene-2,2'-disulphonic acids, stilbylnaphthotriazoles, bis-(benzoxazol-2-yl) derivatives, monomethine-cyanines, 2,7-bis-(aroylamino)-dibenzothiophene-dioxide-3,6-disulphonic acids, 1,3-diarylpyrazolines, styrylbenzoxazoles, bis-styrylaryl compounds, bis-benzoxazolylaryls or oxadiazoles.

A further advantage of the process according to the invention is based on the fact that it permits elimination of anionic surface-active agents and anionic dyeing auxiliaries from aqueous waste liquors, Such anionic compounds are described in more detail in the book "Tenside-Textilhilfsmittel-Waschrohstoffe" ("Detergents-Textile Auxiliaries-Raw Materials for Washing Purposes") by Dr. Kurt Linder (published by Wissenschaftliche Verlagsgesellschaft MBH Stuttgart 1964), volume 1; pages 561–835. Anionic compounds of the alkylarylsulphonic acid type are of particular practical interest. The retaining capacity is very particularly pronounced in the case of anionic compounds of the alkylarylsulphonic acid type, in which the alkyl part has 10 to 14 carbon atoms.

The process according to the invention can also be of assistance in cases where the elimination of anionic synthetic tanning agents, especially tanning agents which carry one or more sulpho groups in the molecule, is concerned. Such compounds are well-known to experts under the name "Syntane". A more detailed description of these compounds is to be found in "Ullmanns Encyklopadie der technischen Chemie" ("Ullmanns Encyclopaedia of industrial Chemistry"), volume 11; pages 595–598.

By suitable choice of the precipitant it is possible, according to the invention, to remove up to 100% of the impurity from the effluents. Retention effects of more than 4 g of residual substance, that is to say dyestuff, optical brightener, auxiliary, washing agent or tanning agent, per 100 g of cellulose filter can thereby be achieved. In cases in which it does not prove possible to achieve complete decolourisation or removal of the residual substances by a single pass of the residual liquor through the filter, it is advisable to repeat the filtration process.

It is also possible to reduce the filter materials used to a minimum by the same measure (recirculation).

A particularly economical advantage of the process according to the invention is that the pretreated cellulose filters after saturation with the residual substances from the effluents can be dried in a simple manner and thereafter be passed to an incinerator. A further advantage may be considered to be the fact that waste sheets from printing, the use of which in most cases presents problems, are very suitable for use in the process according to the invention.

The examples which follow explain the invention without restricting it thereto. In the examples, percentages are percentages by weight throughout.

MANUFACTURING INSTRUCTIONS

Precipitant

A. 34 kg of dicyandiamide, 18 kg of urea and 5.5 kg of ammonium chloride in 75 kg of 30% strength hydrochloric acid are boiled for 6 hours under reflux. Thereafter, 80 kg of 37.4% strength aqueous formaldehyde solution are added and the whole is stirred for 6 hours at 75° – 85°C. After completion of the condensation, 10 kg of glacial acetic acid are added to the solution.

B. A mixture of 533 g of ethylenediamine dihydrochloride and 673 g of dicyandiamide is introduced in small portions, over the course of about 2 hours and whilst stirring, into a flask which is immersed in a heating bath at 250° – 255°C. An easily stirrable melt is thereby produced. The mixture is stirred for a further hour at an internal temperature of 250° – 255°C. During introduction of the mixture and during subsequent stirring, ammonia is split off. Thereafter the internal temperature is lowered to about 155°C, whereupon 147 g of glacial acetic acid are allowed to run in over the course of about 5 minutes. The internal temperature is lowered to about 115°C by further cooling and 107 g of paraformaldehyde are introduced over the course of about 15 minutes. The internal temperature is then allowed to drop to 100°C and 363 g of 37% strength aqueous formaldehyde solution are added over the course of about 5 minutes. The mixture is now heated for about 10 – 15 minutes in a boiling water bath, in the course of which the reaction mixture thickens, 600 g of water at about 90°C are allowed to run in and the batch is heated further, for a total of 2 hours, in the boiling water bath. In the course thereof, a clear solution is produced after about 20 minutes. The internal temperature is lowered to about 50°C, the mixture is neutralised by adding sodium bicarbonate, and the reaction product is dried at 50° – 60°C under reduced pressure. An almost colourless, solid residue is obtained, which gives a clear solution in boiling water.

Filter material

C. A suspension of 10 kg of bleached spruce sulphite cellulose in 300 kg of water is mixed with 2.5 kg of the aqueous solution of the dicyandiamide + urea + formaldehyde condensation products according to Instruction A, described above. The entire mass is stirred for 2½ hours at 30° – 40°C. Thereafter the pretreated cellulose is filtered off and dried. The 10 kg of cellulose contain 170 g of the condensation product A bound by absorption.

D. If the 10 kg of bleached spruce sulphite cellulose in instruction C are replaced by 10 kg of waste sheets from printing, in the form of a fine suspension, and the pretreatment is carried out as described under C, with a product according to Instruction B, a filter material which has similarly good properties is obtained.

E. If, in Instruction C, the spruce sulphite cellulose is replaced by Kraft cellulose, a filter material which has similar properties is obtained.

F. If, in Instruction C, the 2.5 kg of the precipitant A are replaced by 1 kg of Versamid 140, a polyamide having an amine value of 350 to 400 mg of KOH/g, an effective filter material is obtained.

G. If, in instruction C, the precipitant A is replaced by a combination of 200 g of Versamid 140 with 200 g of FeCl$_3$. 6H$_2$O, a filter material which has very good properties is obtained.

H. A suspension of 10 kg of bleached spruce sulphite cellulose in 100 kg of water is mixed with 800 g of 50% strength polyethyleneimine (M.W. 30–40,000). The entire mass is kneaded mechanically for 20 minutes. This mixture is subsequently dried in a vacuum oven at 90°C.

I. A suspension of 10 kg of finely chopped waste sheets from printing in 300 kg of water is stirred with 1 kg of Versamid 140 for 3 hours at a temperature of 20°–25°C. After this time, the fine suspension is pressed out to 30 kg. The filter cake is dried in a vacuum oven at 80°–90°C. The dry mass is comminuted and stirred into 300 kg of water. 5 l of a 10% strength AlCl₃ solution are allowed to run in and after 20 minutes 2 l of ammonia solution (25% strength) are added to the aqueous suspension. The mass is again pressed out to 30 kg and dried in a vacuum oven at 90°C.

J. If, in Instruction H, the polyethyleneimine is replaced by a combination of 800 g of 50% strength polyethyleneimine with 1,025 g of Al₂(SO₄)₃ . 18H₂O, a further suitable filter is obtained.

K. A suspension of 10 kg of bleached spruce sulphite cellulose in 500 kg of water is treated with 1 kg of Versamid 140. The suspension is stirred for 300 minutes at 20°C. 33.5 l of a 1% strength polymethacrylic acid solution (M.W. 80–100,000) which has been adjusted to pH = 6.1 with sodium hydroxide solution are stirred into this suspension over the course of 20 minutes. The mass is stirred for an additional short period and 6.67 l of a 10% strength AlCl₃ solution are added. Thereafter the pH value of this suspension is adjusted to 9.5 with a 10% strength ammonia solution, the whole is stirred for about 60 minutes, and the filter material is pressed out to 30 kg. The filter material is used directly, in this moist state, for the purification of the effluents.

L. A suspension of 10 kg of bleached spruce sulphite cellulose in 500 kg of water is treated with 1 kg of Versamid 140. The suspension is stirred for 300 minutes at 20°C. 67.0 l of a 1.5% strength solution of the sodium salt of carboxymethylcellulose (D.S. approx. 0.8) were stirred into this suspension over the course of 20 minutes. The mass is subsequently stirred for an additional short period and pressed out on a filter to a weight of approx. 30 kg. A readily usable filter material is obtained.

M. The filter is manufactured in the same way as in Instruction L, but 1 kg of Versamid 140 is replaced by 1 kg of polyethyleneimine (M.W. 30–40,000) and the 67.0 l of a 1.5% strength carboxymethylcellulose solution are replaced by 67.0 l of a 1% strength polymethacrylic acid solution (M.W. 80–100,000).

EXAMPLE 1

2,000 l of a residual liquor of dark blue colour, which still contains 200 g of the dyestuff of the formula

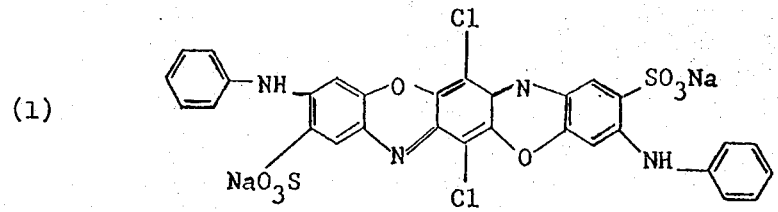

in the dissolved form are passed, at a temperature of 95° – 98°C, through a filter manufactured according to Instruction C. The filtrate resulting under these conditions is now colourless.

If the same filtration is carried out using 10 kg of untreated cellulose, only 35% of the total dyestuff are retained.

EXAMPLE 2

400 l of an intensely orange-coloured residual liquor which still contain 40 g of the dyestuff of the formula

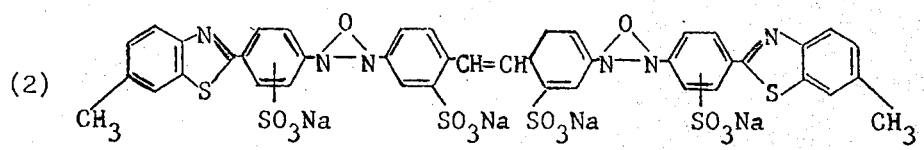

are filtered through 1 kg of spruce sulphite cellulose pretreated according to Instruction C. The filtrate obtained under these conditions is practically colourless.

A similarly good result is obtained if instead of the pretreated spruce sulphite cellulose according to Instruction C the same amount of Kraft cellulose, according to Instruction E, treated in the same manner is employed.

EXAMPLE 3

2,000 l of a blue-coloured residual liquor which still contains 100 g of dissolved dyestuff of the formula

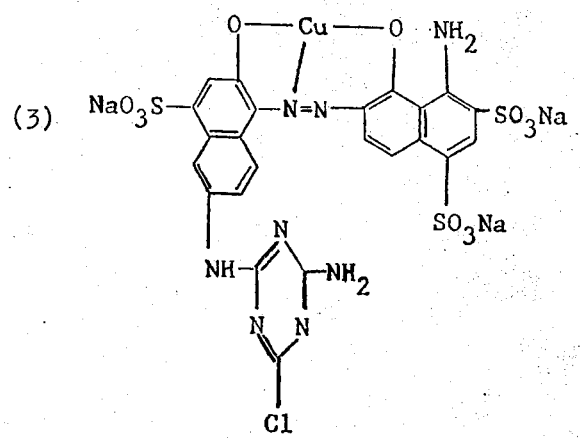

are filtered through 10 kg of cellulose treated according to Instruction C, at a temperature of 90° – 95°C. If these conditions are observed, 80% of the dyestuff are retained. If this filtrate, containing 20% of the residual dyestuff, is filtered a second time through the filter material which has already been used, a completely decolourised filtrate is obtained. If the same filtration is carried out using cellulose which has not been pretreated, the dyestuff retention is only 7%.

EXAMPLE 4

1,000 l of a brown-coloured residual liquor which still contains 50 g of dyestuff of the formula

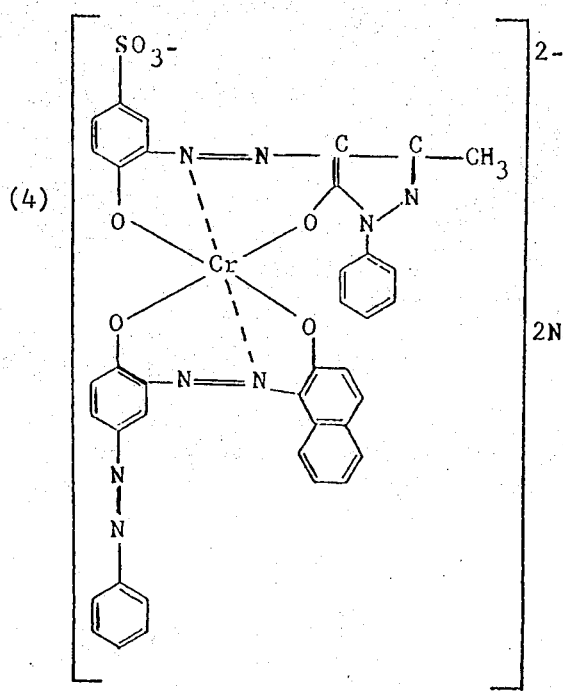

EXAMPLE 5

2,000 l of residual liquor which still contains 9.2 g of the optical brightener of the formula

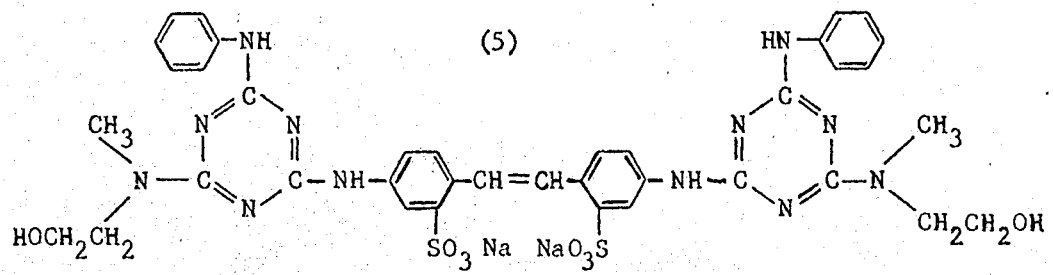

are forced, at a temperature of 75° – 80°C, through a filter consisting of 10 kg of spruce sulphite cellulose which has beforehand been treated according to Instruction C. The resulting filtrate has been completely freed of the optical brightener.

If, in this example, the 10 kg of spruce sulphite cellulose pretreated according to Instruction C are replaced by 10 kg of Kraft cellulose which is treated, according to Instruction C, with a condensation product manufactured according to Instruction B, a filtrate which has been completely freed of the optical brightener is again obtained.

EXAMPLE 6

1,000 l of a residual liquor which still contains 8 g of an optical brightener of the formula

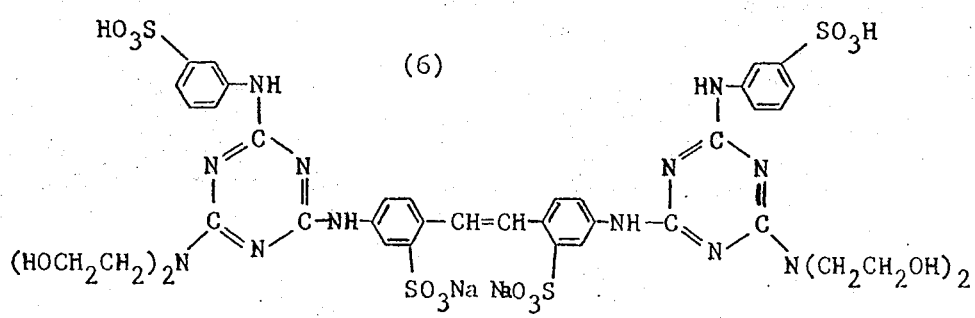

are passed, at a temperature of 85°C, through a filter consisting of 5 kg of cellulose pretreated according to Instruction C. The resulting filtrate proves to be largely colourless.

If the cellulose pretreated according to Instruction C is replaced by the same amount of waste sheets from printing, pretreated according to Instruction D, a largely colourless filtrate is again obtained.

are passed, at a temperature of 35° – 40°C, through a filter consisting of 5 kg of cellulose pretreated according to Instruction C. The filtrate obtainable in this manner has been completely freed of the abovementioned optical brightener.

EXAMPLE 7

2,500 l of a residual liquor of dark red colour, which has been adjusted to pH 4 and contains 250 g of the dyestuff of the formula

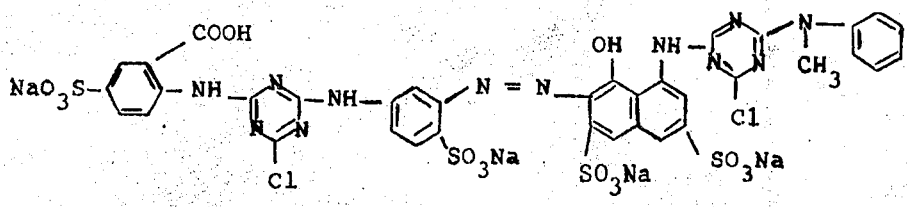

in the dissolved form, are passed, at a temperature of 95°–98°, through a filter manufactured according to Instruction F.

The filtrate resulting under these conditions is now colourless.

EXAMPLE 8

3,400 l of a residual liquor of dark red colour, which has been adjusted to pH 4 and contains 340 g of the dyestuff of the formula

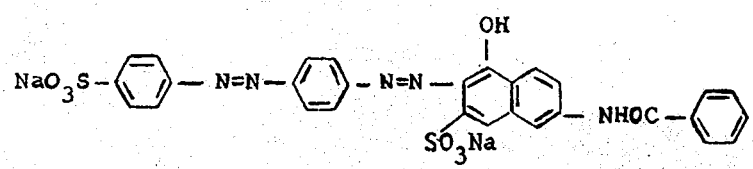

in the dissolved form, are passed, at a temperature of 95°–98°C, through a filter manufactured according to Instruction G. The filtrate resulting under these conditions is practically colourless.

If the same filtration is carried out using filter material described in Example 7, only 2,000 l of the dyestuff solution can be decolourised.

EXAMPLE 9

2,000 l of a residual liquor of dark red colour, which has been adjusted to pH 4 and which contains 200 g of the dyestuff mentioned in Example 7, in the dissolved form, are passed at a temperature of 95°–98°C through a filter manufactured according to Instruction H. The filtrate resulting under these conditions is completely colourless.

EXAMPLE 10

4,600 l of a residual liquor of dark red colour which has been adjusted to pH 4 and which still contains 460 g of the dyestuff described in Example 7, in the dissolved form, are passed at a temperature of 95°–98°C through a filter manufactured according to Instruction J.

The filtrate resulting under these conditions is colourless.

EXAMPLE 11

9,000 l of a residual liquor of dark red colour, which has been adjusted to pH 4 and which contains 900 g of the dyestuff mentioned in Example 7, in the dissolved form, are passed at a temperature of 95°–98°C through a filter manufactured according to Instruction K. The filtrate resulting under these conditions is practically colourless.

EXAMPLE 12

6,000 l of a residual liquor of dark red colour, which has been adjusted to pH 4 and which contains 600 g of the dyestuff mentioned in Example 7, in the dissolved form, are passed at a temperature of 95°–98°C through a filter manufactured according to Instruction L. The filtrate resulting under these conditions is practically colourless.

EXAMPLE 13

7,500 l of a residual liquor of dark red colour, which has been adjusted to pH 4 and which still contains 750 g of the dyestuff mentioned in Example 7, in the dissolved form, are passed at a temperature of 95°–98°C through a filter manufactured according to Instruction M. The filtrate resulting under these conditions is practically colourless.

EXAMPLE 14

8,500 l of rinsing liquor of dark red colour, which has been adjusted to pH 4 with acetic acid and which contains 850 g of the dyestuff described in Example 7, and 1,940 g of an anionic auxiliary of the formula

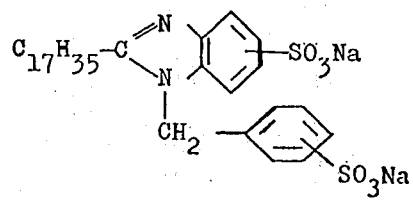

in the dissolved form are passed, at a temperature of 95°–98°C, through a filter manufactured according to Instruction K. The resulting filtrate is completely colourless.

EXAMPLE 15

3,700 l of a dyeing liquor of dark blue colour which has been adjusted to pH 4 and which contains 370 g of the dyestuff of the formula

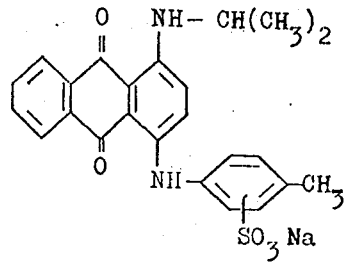

and 1,850 g of a dyeing auxiliary of the composition

37% 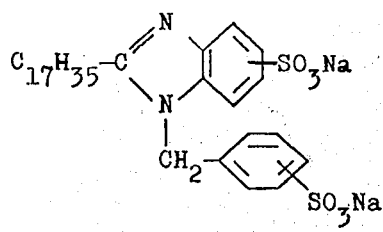

9.3% 

2.9%  $C_{16}H_{33}O(CH_2CH_2O)_6H$ 9.0% 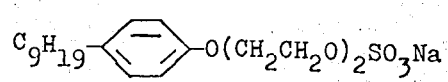

41.8% of water in the dissolved form were passed through a filter manufactured according to Instruction I, at a temperature of 95°–98°C. The resulting filtrate is colourless.

EXAMPLE 16

1,500 l of a washing liquor which has been adjusted to pH 4 with acetic acid and which contains 1,500 g of a detergent of the formula

of commercial quality are passed through a filter manufactured according to Instruction K, at a temperature of 90°–95°C. The resulting filtrate is practically free of detergent. To test for the detergent, a 100 ml sample of the filtrate was adjusted to pH 4.5 with acetate buffer and 5 ml of a 3% strength $Al_2(SO_4)_3 \cdot 18H_2O$ solution were added at room temperature. If the detergent is present, a turbidity or precipitate results. The filtrate resulting from the experiment gave no precipitate with aliminium sulphate.

We claim:

1. A process for purifying industrial effluents containing residual substances consisting of dyestuffs, optical brighteners, dyeing auxiliaries, detergents or tanning agents, which comprises bringing said effluents into contact with a cellulosic adsorbent which is pretreated with polyamidopolyamines produced by condensation from a polymeric fatty acid and a polyamine, to remove said substances.

2. Process according to claim 1 wherein the purification of the effluents is carried out at 30° to 130°C.

3. Process according to claim 1, wherein the effluents are passed over a cellulosic filter pretreated with said polyamidopolyamines.

4. Process according to claim 3, wherein the cellulosic filter is pretreated with a polyamide which has an amine value in the range of 200 to 650 milligrams of potassium hydroxide per gram of polyamide.

5. Process according to claim 3, wherein the cellulosic filter is pretreated with a mixture of said polyamidopolyamines and a salt of a polyvalent metal.

6. Process according to claim 5, wherein the cellulosic filter is pretreated with a mixture produced from said polyamidopolyamines and a salt of a polyvalent metal in the presence of an inorganic or organic base.

* * * * *